US011796036B2

(12) United States Patent
Brouwer

(10) Patent No.: US 11,796,036 B2
(45) Date of Patent: Oct. 24, 2023

(54) ACTUATOR

(71) Applicant: MCi (Mirror Controls International) Netherlands B.V., Woerden (NL)

(72) Inventor: Stefan Fritz Brouwer, Schoonhoven (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 17/260,897

(22) PCT Filed: Jul. 17, 2019

(86) PCT No.: PCT/NL2019/050456
§ 371 (c)(1),
(2) Date: Jan. 15, 2021

(87) PCT Pub. No.: WO2020/017966
PCT Pub. Date: Jan. 23, 2020

(65) Prior Publication Data
US 2021/0293306 A1    Sep. 23, 2021

(30) Foreign Application Priority Data

Jul. 18, 2018   (NL) ...................................... 2021341

(51) Int. Cl.
*F16H 1/20* (2006.01)
*F16H 1/16* (2006.01)
(Continued)

(52) U.S. Cl.
CPC ................. *F16H 1/20* (2013.01); *F16H 1/16* (2013.01); *F16H 55/0806* (2013.01);
(Continued)

(58) Field of Classification Search
CPC .......... F16H 1/20; F16H 1/16; F16H 55/0806; F16H 55/22; F16H 57/021;
(Continued)

(56) References Cited

U.S. PATENT DOCUMENTS 2,193,431 A * 3/1940 Probst ..................... F16H 37/08
475/203
10,400,881 B1 * 9/2019 Ramirez Ortiz ..... B60N 2/0232
(Continued)

FOREIGN PATENT DOCUMENTS

DE          10254129 A1 *  6/2004 .......... A47C 20/041
DE    102008054398 A1 *  6/2010 ............. F16D 65/14
(Continued)

*Primary Examiner* — Zakaria Elahmadi
(74) *Attorney, Agent, or Firm* — Volpe Koenig

(57) ABSTRACT

Actuator provided with a low voltage DC motor which is coupled via a two-stage reduction mechanism with an output gear wheel, wherein the reduction mechanism comprises a first stage with a worm carried on the motor shaft of the DC motor, which worm in a right-angle transmission cooperates with the circumference of an intermediate gear wheel, which intermediate gear wheel is carried on an intermediate shaft which carries along its axis a spiral pinion, and wherein the reduction mechanism furthermore comprises a second stage with the spiral pinion which in a parallel transmission cooperates with the circumference of the output gear wheel, which is implemented as a spiral gear wheel.

12 Claims, 5 Drawing Sheets

(51) Int. Cl.
 *F16H 55/08* (2006.01)
 *F16H 55/22* (2006.01)
 *F16H 57/021* (2012.01)

(52) U.S. Cl.
 CPC ........... *F16H 55/22* (2013.01); *F16H 57/021* (2013.01); *F16H 2702/00* (2013.01)

(58) Field of Classification Search
 CPC .. F16H 2702/00; F16H 55/082; F16H 55/084; F16H 55/086; H02K 7/116
 See application file for complete search history.

(56) References Cited

U.S. PATENT DOCUMENTS

| | | | | |
|---|---|---|---|---|
| 2004/0105178 | A1* | 6/2004 | Brouwer | B60R 1/072 359/872 |
| 2017/0240114 | A1* | 8/2017 | Brouwer | B60R 1/072 |
| 2018/0334054 | A1* | 11/2018 | Higuchi | B60N 2/06 |

FOREIGN PATENT DOCUMENTS

| | | | | |
|---|---|---|---|---|
| DE | 102010003044 A1 | | 9/2011 | |
| JP | 2005-201381 A | | 7/2005 | |
| JP | 2006-057690 A | | 3/2006 | |
| JP | 2010-261514 A | | 11/2010 | |
| JP | 2012-159163 A | | 8/2012 | |
| WO | WO2016048139 | * | 9/2014 | ............ B60R 1/072 |
| WO | WO-2015135970 A1 | * | 9/2015 | ............ B60T 11/04 |
| WO | 2016/048139 A1 | | 3/2016 | |

\* cited by examiner

ACTUATOR

CROSS REFERENCE TO RELATED APPLICATIONS

This application is a 35 USC § 371 National Stage application of International Patent Application No. PCT/NL2019/050456, which was filed Jul. 17, 2019, entitled "ACTUATOR," which claims priority to Netherlands Patent Application No. 2021341, filed Jul. 18, 2018 and is incorporated herein by reference as if fully set forth.

The invention relates to an actuator provided with a low-voltage DC motor which is coupled via a two-stage reduction mechanism with an output gear wheel.

Actuators of this type are generally known, and are for instance mass-produced and used for so-called power fold actuators for folding in and folding out exterior vision units of motor vehicles. A low-voltage DC motor has as an advantage that it is relatively low-cost and can be connected directly to the board net of a motor vehicle. As the speed of the motor shaft of such a motor is too high for many applications, and the couple supplied via the motor shaft is too small, usually a reduction mechanism is applied to lower the output speed, and to increase the couple supplied. A speed that is characteristic of a low-voltage DC motor is 6000 rpm, while a typical desired adjustment speed for, for example, an actuator for folding an exterior vision unit in and out is 30°/second. A desired transmission ratio for the reduction mechanism in that case is 1:1200. Such a transmission ratio, in practice, is not simple to realize in a single transmission step. To that end, the actuator usually includes a two-stage reduction mechanism, where, for example, a first stage has a transmission ratio of 1/30, and a second stage has a transmission ratio of 1/40.

In the known transmission, the reduction mechanism comprises a first stage with a first worm, carried on the motor shaft of the DC motor, which cooperates with the circumference of an intermediate gear wheel, also known as worm wheel. Worm and worm wheel form a right-angle transmission, that is, the respective axes cross each other at an angle of about 90°, for example in a range between around 85° and around 95°. The worm wheel or intermediate gear wheel is carried on an intermediate shaft which carries along its axis a second worm. The second worm in a second right-angle transmission cooperates with the circumference of a second worm wheel or an output gear wheel, whose axis coincides with an output shaft of the actuator. In many embodiments, the DC motor is then disposed with its motor shaft substantially parallel to the output shaft, but to save overall height may also be disposed, for example, with its motor shaft transverse to the output shaft. The driven gear wheel of the first stage is then in a plane which extends transversely to the plane of the output gear wheel.

While the known reduction mechanism provides many advantages, and, for example for power fold actuators, is annually produced in large numbers, it has as a disadvantage that it requires relatively much overall space, and is relatively costly to produce.

The object of the invention is to provide an actuator with an improved reduction mechanism, with which, while preserving the advantages mentioned, the disadvantages mentioned can be counteracted. In particular, the object of the invention is to provide an actuator which can be produced more cost-effectively, and which has a more compact construction in at least one dimension, and more particularly has an overall height which is substantially equal to at most twice the thickness of the DC motor.

To this end, the invention provides an actuator provided with a low-voltage DC motor which is coupled with an output gear wheel via a two-stage reduction mechanism, wherein the reduction mechanism comprises a first stage with a worm carried on the motor shaft of the DC motor, which worm in a right-angle transmission cooperates with the circumference of an intermediate gear wheel, which intermediate gear wheel is carried on an intermediate shaft which carries along its axis a spiral pinion, and wherein the reduction mechanism furthermore comprises a second stage with the spiral pinion which in a parallel transmission cooperates with the circumference of the output gear wheel, which is implemented as a spiral gear wheel.

By implementing the driving element in the second stage of the transmission as a spiral pinion which in a parallel transmission cooperates with an output gear wheel implemented as a spiral gear wheel, the length of the driving element of the second stage—while the diameter of the driven element of the second stage remains the same—can be considerably shorter. This allows significant savings on material, and hence on manufacturing costs. Furthermore, due to the parallel transmission in the second stage, the driven intermediate gear wheel of the first stage can extend with partial overlap along the driven element, in particular the output spiral gear wheel, of the second stage, thus allowing overall space to be saved. Thus, given a placement of the motor shaft transverse to the output shaft, for instance a reduction mechanism can be chosen whose overall height is substantially equal to at most twice the thickness of the DC motor, and in particular is even less than or equal to the thickness of the DC motor. The driven element, in particular the driven intermediate gear wheel, of the first stage then is not determinative of the overall height anymore. In addition, by the use of the spiral pinion transmission in the second stage, the efficiency of the transmission can be considerably increased with respect to a transmission with two worm wheel transmissions. As a result, with the moment to be supplied remaining the same, a lighter and hence lower-cost DC motor can suffice. In this way also, costs can be saved.

When the spiral pinion comprises a bevel toothing with a tooth angle that is greater than 15°, for example between 15° and 35°, it can be achieved that the number of teeth of the spiral pinion can be relatively low, and the transmission ratio of the second gear wheel stage high.

When the spiral pinion comprises only one or two teeth, the transmission ratio of the second stage can in practice be very high, for example between around 1:20 and around 1:60, for example 1:40. In this manner, elegantly, a high transmission ratio can be achieved.

When the spiral pinion has one or two teeth, and when the axial length of the spiral pinion is chosen such that the teeth then make at least a whole and a half revolution, respectively, over the circumference of the spiral pinion, it can be achieved that the teeth are each continuously in engagement with the driven spiral gear wheel, so that a quiet and uniform transmission is obtained.

When the intermediate shaft, near the end of the spiral pinion, is provided with a bearing, it can be achieved that the spiral pinion can be made of relatively light design.

When the spiral pinion furthermore cooperates at its circumference with a support, in particular a support spiral pinion or a bearing surface, the stability of the spiral pinion can be further increased. Preferably, the support is placed opposite to the side of the spiral pinion that is in engagement with the spiral gear wheel. Through such an inclusion of the spiral pinion between the spiral gear wheel and the support, it can be achieved that the spiral pinion can be of relatively light and hence cost-effective construction. By implementing the support as a bearing surface, the construction can be particularly compact and cost-effective.

When the spiral gear wheel is provided with an inner toothing for cooperation with a spindle, it can be achieved that the actuator obtains a linear output movement in a relatively simple and compact manner.

It is noted that the DC motor within this context can be taken as a direct-current electric motor with an operating voltage of at most 30V, in particular 24V or 13.5V. Furthermore, it is noted that the output spiral gear wheel within this context does not need to have a complete and closed ring-shaped circumference, but that within this context a spiral gear wheel whose circumference is interrupted, or which forms a ring segment, for example with a gear wheel segment of 270 degrees, should also be understood to fall under a spiral gear wheel.

The invention also relates to adjusting instruments provided with an actuator.

Further advantageous embodiments of the invention are set forth in the subclaims.

The invention will be further elucidated on the basis of exemplary embodiments that are represented in drawings. In the drawings.

Figure 1:
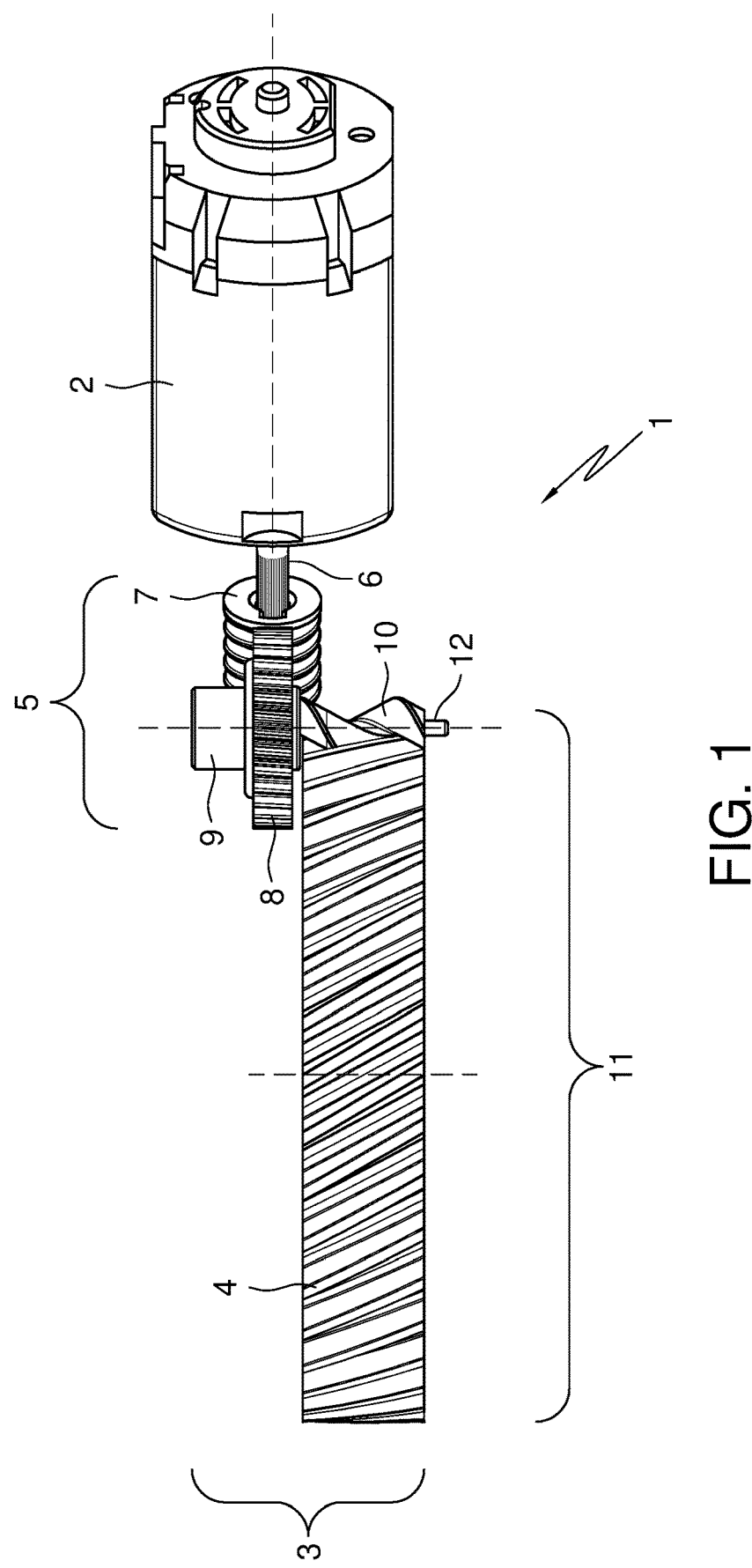
FIG. 1 shows a schematic side view of a first embodiment of the actuator according to the invention.

It is noted that the figures are only schematic representations of preferred embodiments of the invention, and that these are given by way of non-limiting exemplary embodiment. In the exemplary embodiment, like or corresponding parts in the different embodiments are designated with the same reference numerals.

Figure 2:
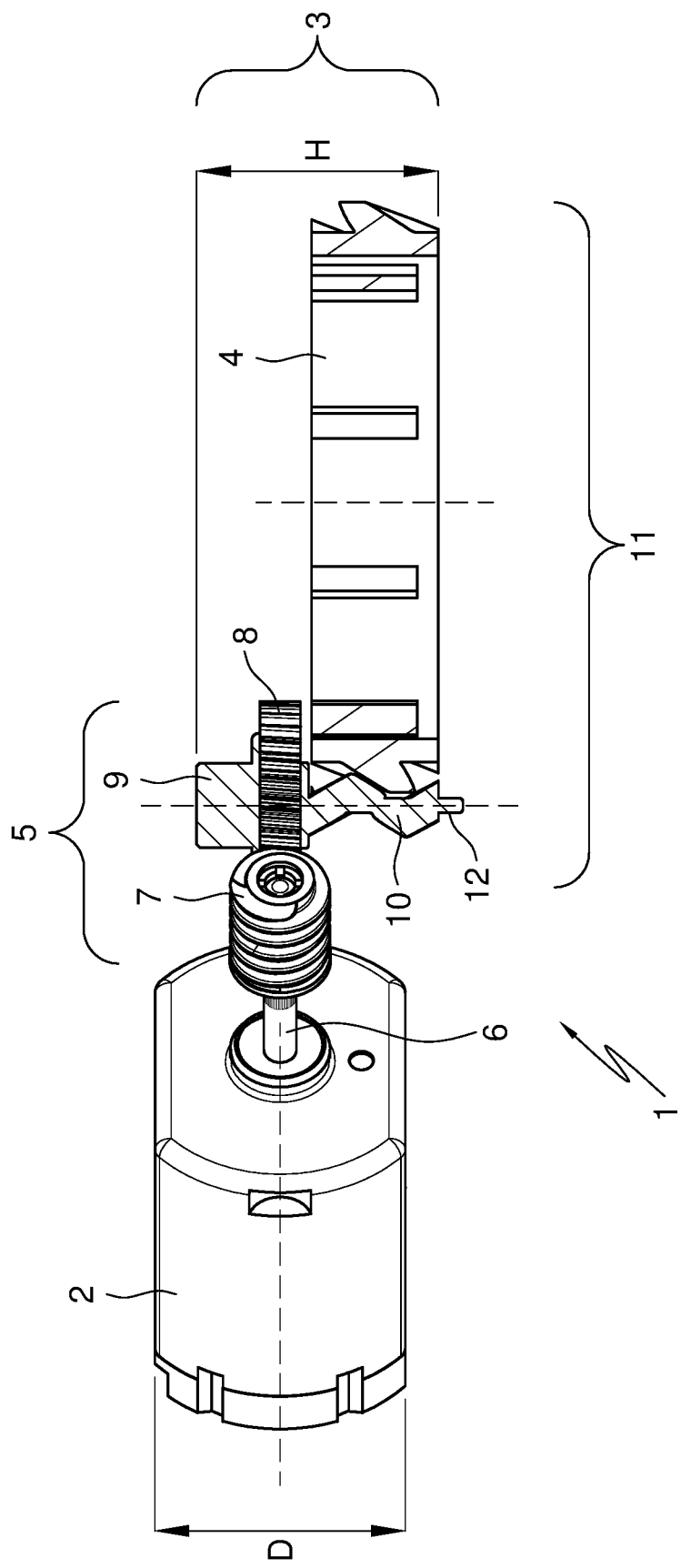
FIG. 2 shows a schematic, partly sectional view of the actuator of FIG. 1.

FIG. 1 and FIG. 2 show a first embodiment of an actuator 1 according to the invention. The actuator 1 comprises a 13.5V DC electric motor 2 which is coupled via a two-stage reduction mechanism 3 with an output gear wheel 4. The reduction mechanism 3 comprises a first stage 5 with a worm 7 carried on the motor shaft 6 of the DC motor 2. The worm 7 in a right-angle transmission cooperates with the circumference of an intermediate gear wheel 8. The longitudinal axis of the motor shaft 6 which carries the worm 7 extends transversely to the longitudinal axis of the intermediate gear wheel 8. The worm 7 and the intermediate gear wheel 8 respectively form the driving element and the driven element of the first stage 5 of the reduction mechanism 3. In this exemplary embodiment, the output speed of the motor shaft 6 at nominal load is, for example, 6000 rpm at a supplied nominal moment to the motor shaft 6 of 5 Nmm. The transmission ratio of the first stage 5 in this example is 1:30, and may for instance be chosen in practice between around 1:20 and around 1:50.

The intermediate gear wheel 8 is carried on an intermediate shaft 9 which carries along its axis a spiral pinion 10. The spiral pinion 10 in this example has a module of 0.7 mm, one tooth having a tooth angle of 15° and a length of 0.8 mm.

Furthermore, the reduction mechanism 3 comprises a second stage 11 with the spiral pinion 10 carried on the intermediate shaft 9. The spiral pinion 10 in a parallel transmission cooperates with the circumference of an output spiral gear wheel 4. The spiral pinion 10 and the spiral gear wheel 4 respectively form the driving element and the driven element of the second stage of the reduction mechanism. The transmission ratio of the second stage 11 in this example is 1:40, and may for instance be chosen in practice between around 1:20 and around 1:60.

In this parallel transmission in the second stage, the axes of the spiral pinion 10 and the spiral gear wheel 4 run substantially parallel. The intermediate gear wheel 8 is in a plane which is parallel to the spiral gear wheel 4, and can hence be implemented with a relatively large number of teeth and associated large diameter, so that a high transmission ratio can be achieved with a relatively small overall height. The intermediate gear wheel 8 and the spiral gear wheel 4 are further disposed in mutual overlap, so that also in width direction a relatively compact construction can be achieved.

The intermediate shaft 9 is provided with a bearing 12 near the end of the spiral pinion 10. In this way, the spiral pinion 10 is axially retained and can be of relatively light design.

Figure 4:
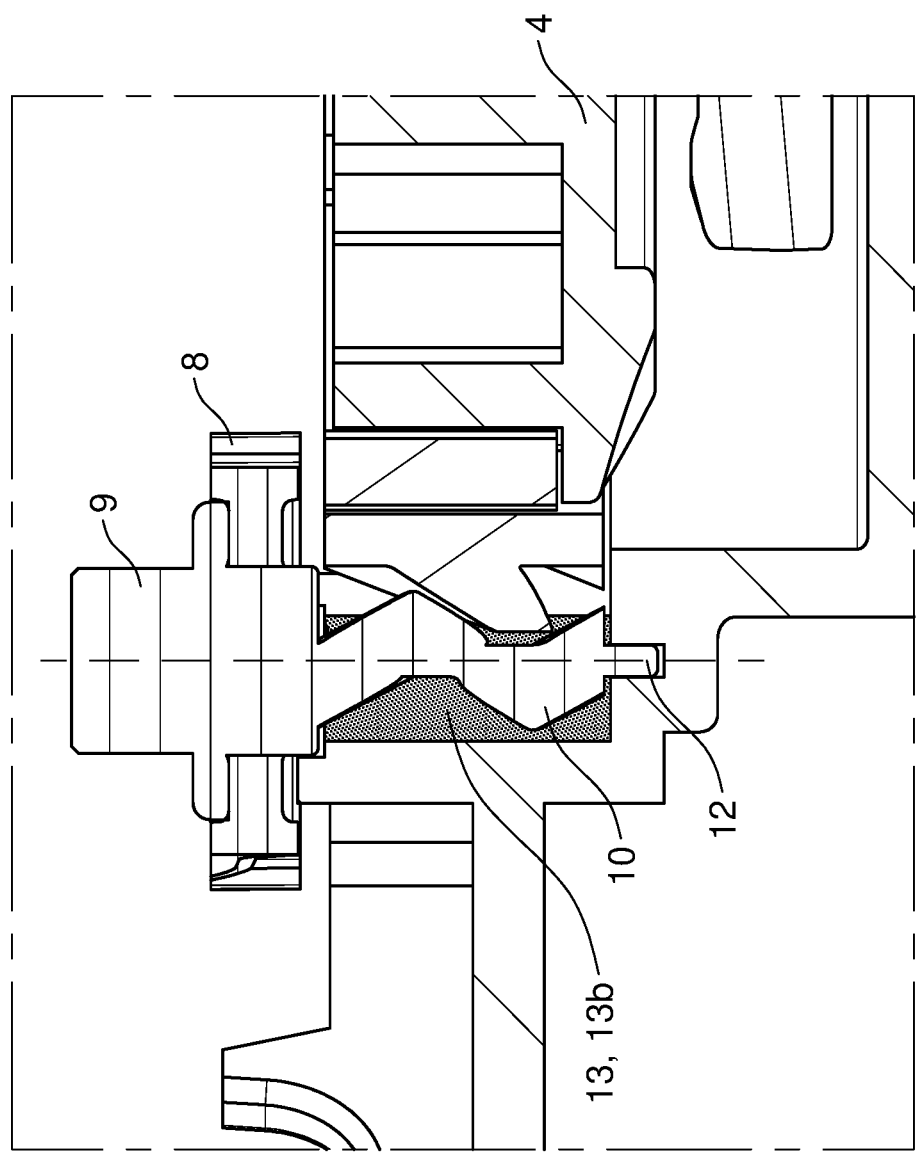
FIG. 4 shows a schematic, partly sectional detailed view of a third embodiment of the actuator according to the invention, where a bearing surface has been arranged in a housing case.

Also, in the example of FIG. 2, the height H of the reduction mechanism 3 is less than the thickness D of the DC motor. Moreover, the intermediate gear wheel 8 is in a plane which extends substantially transversely to the axis of rotation of the spiral gear wheel 4. As can be seen in FIG. 4, there too, the intermediate gear wheel 8 partly overlaps the spiral gear wheel 4. In this manner, elegantly, a compact construction can be obtained.

Figure 3:
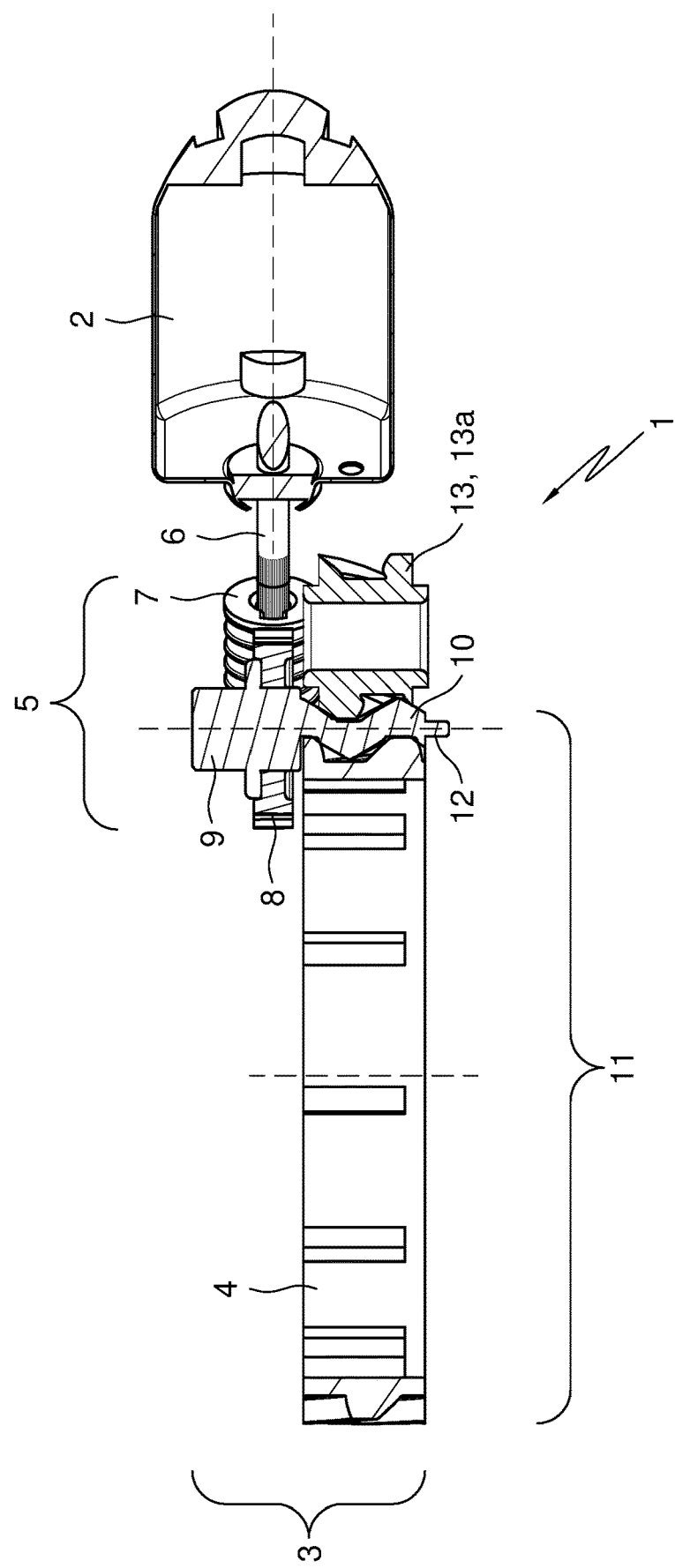
FIG. 3 shows a schematic, partly sectional view of a second embodiment of the actuator according to the invention, where a support spiral pinion has been arranged.

FIG. 3 shows a second embodiment of the actuator 1 according to the invention. The actuator 1 shown here shows furthermore a support 13 with which the spiral pinion 10 cooperates at its circumference. In this exemplary embodiment, the support 13 is implemented as a support spiral pinion 13a. As can be seen in FIG. 3, the support spiral pinion 13a is positioned on the side of the spiral pinion 10 opposite to that which is in engagement with the spiral gear wheel 4. Furthermore, the support spiral pinion 13a is disposed rotatably about a support shaft not shown. In this way, the support spiral pinion 13a provides for a radial bearing of the spiral pinion 10 and thereby improves the stability of the spiral pinion 10.

FIG. 4 shows a third embodiment of the actuator 1 according to the invention. In this exemplary embodiment, the support 13 is implemented as a bearing surface 13b which is included in a casing of the housing of the actuator 1. The bearing surface 13b preferably extends at least over a part of the circumference of the spiral pinion 10 that is free of the part of the spiral pinion 10 that is in direct contact with the output spiral gear wheel 4. In this manner, a radial bearing of the spiral of the spiral pinion 10 is ensured in a relatively simple manner, and with a small core diameter of the spiral pinion yet a considerable force can be transmitted.

The actuator can be particularly advantageously applied in a motor vehicle for adjusting a housing with an exterior vision unit, such as an exterior mirror, camera, LIDAR and/or display. The actuator can for instance be advantageously applied in an adjusting instrument for an exterior vision unit for a vehicle, in particular a motor vehicle, to observe and/or monitor the position of the vehicle with respect to the surroundings. The adjusting instrument then comprises a housing with an exterior vision unit, such as an exterior mirror, camera, LIDAR and/or display.

The housing is then adjustable via the actuator relative to a base 21 of the adjusting instrument, to be mounted on the motor vehicle. The adjusting instrument is often intended to adjust the exterior vision unit between a park position, for example a fold-in position in which the housing extends substantially along the vehicle, and a work position, for example a drive position in which the housing extends substantially transversely to the vehicle.

The base 21 of the adjusting instrument then comprises a foot 22 for mounting on an outer part of the body of the motor vehicle, and a pivoting shaft 23 extending from the foot 22 along a longitudinal axis of standing orientation with respect to the fixed world, for receiving the housing in a manner pivotable around it. The housing is connected to the base 21 via the actuator, so that the pivoting movement by which the carrier folds in and out can be carried out in a driven manner.

In such an application, there is provided an adjusting instrument for an exterior vision unit for a vehicle, comprising:
- a base, comprising a foot and a pivoting shaft extending therefrom along a longitudinal axis,
- a housing which surrounds the pivoting shaft, and which is pivotable around the longitudinal axis of the pivoting shaft in an adjustment range, between at least a park position and a work position, and an actuator which is operative between the base and the housing to adjust the housing in the adjustment range relative to the pivoting shaft.

The motor and the first stage of the actuator can then, for instance, be carried by the housing, and the spiral gear wheel may be carried by the pivoting shaft.

Figure 5:
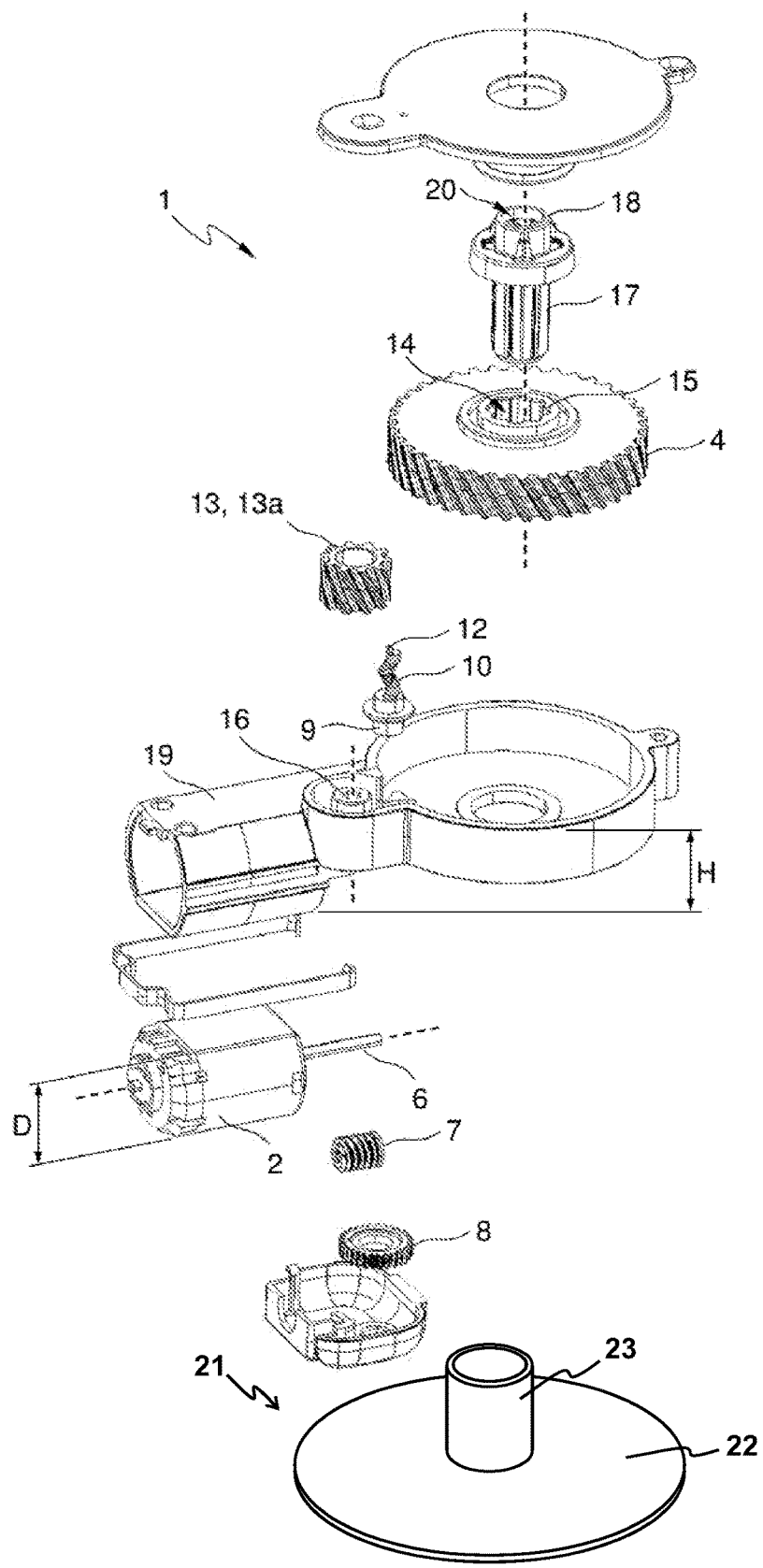
FIG. 5 shows an exploded schematic perspective view of a fourth embodiment of the actuator according to the invention.

FIG. 5 shows a fourth embodiment of the actuator 1 according to the invention. Represented in FIG. 5 is an exploded perspective view of an actuator 1 including housing 19. Included in the housing 19 is a support shaft 16 for a support spiral pinion 13a for radial bearing of the spiral pinion 10. From FIG. 5 it can be inferred from the housing 19 that the height H of the reduction mechanism 3 is less than twice the thickness D of the DC motor, and, in particular, is of the same order of magnitude as the thickness D of the DC motor. Furthermore, the output spiral gear wheel 4, along its output axis, on its inner side, is provided with a recess 14 with an inner toothing 15 which cooperates with a toothing 17 of a hollow shaft 18. The hollow shaft 18 carries the output spiral gear wheel 4 and is bearing-mounted in the housing 19. The hollow shaft 18 is provided on its inner side with screw thread 20 for cooperation with the thread of a screw spindle not shown. The spindle is suitable in particular for obtaining a linear output movement. By providing such a hollow shaft 18, this can be done cost-effectively in a special material which has been tuned for cooperation with the screw spindle, for example, a strong wear-resistant material of low friction, such as bronze or a technical plastic such as HNPE, POM, Nylon or PEPT. Such an actuator with a linear output movement can naturally also be obtained by providing the spiral gear wheel 4 with inner thread at the recess 14 for cooperation with the thread of a screw spindle not shown.

Such a variant of the actuator with a rotation-translation converter on the second stage can be applied in an adjusting instrument for performing a linear adjustment on elements of motor vehicles, for example, adjustment of air guiding screens, in particular air dams. Such air guiding screens are applied for influencing air streams to, for example, a motor housing and/or disc brakes of the motor vehicle by regulation of the air supply. By regulating a position of the screens, the air supply to, for example, the motor housing and/or the disc brakes can be influenced. Also, the actuators may be used for influencing air streams around the motor vehicle by controlling, for example, screens under and/or on the rear of the motor vehicle to thereby regulate the air resistance. With such screens, for example, the consumption of the motor vehicle can be improved and/or the air resistance can be increased, for example, for a shorter brake path.

In such an application, there is provided an adjusting instrument for adjusting a screen for a vehicle, comprising an actuator and a rotation-translation converter which by its input is coupled with the spiral gear wheel of the actuator, and which by its output is couplable with a spindle. During use, the output of the spiral gear wheel is then coupled with a spindle, and the spindle in its turn is coupled with a screen.

It is noted furthermore that the invention is not limited to the exemplary embodiments described here. Many variants are possible. Thus, the first stage may also be implemented with multiple series-connected gear wheel pairs or with a first spiral pinion which cooperates with an intermediate spiral gear wheel. Also, the first stage may be driven by a different type of DC electric motor, such as a stepping motor or by a brushless DC motor.

Such variants will be apparent to the person skilled in the art and are understood to fall within the scope of the invention as set forth in the appended claims.

LIST OF REFERENCE SIGNS

1. Actuator
2. DC motor
3. Reduction mechanism
4. Output spiral gear wheel
5. First stage
6. Motor shaft
7. Worm
8. Intermediate gear wheel
9. Intermediate shaft
10. Spiral pinion
11. Second stage
12. Bearing
13. Support
13a. Support spiral pinion
13b. Bearing surface
14. Recess
15. Inner toothing
16. Support shaft
17. Toothing
18. Hollow shaft
19. Housing
20. Screw thread
21. Base
22. Foot
23. Pivoting shaft
D. Thickness of DC motor
H. Height of reduction mechanism

The invention claimed is:

1. An adjusting instrument for an exterior vision unit for a vehicle, comprising:
   a base, comprising a foot and a pivoting shaft extending therefrom along a longitudinal axis,
   a housing which surrounds the pivoting shaft, and which is pivotable around the longitudinal axis of the pivoting shaft in an adjustment range, between at least a park position and a work position, furthermore comprising an actuator which is operative between the base and the housing to adjust the housing in the adjustment range relative to the pivoting shaft, wherein the actuator is provided with a low voltage DC motor which is coupled via a two-stage reduction mechanism with an output spiral gear wheel, wherein the reduction mechanism comprises a first stage formed by a worm and an intermediate gear wheel, wherein the worm is carried on the motor shaft of the DC motor and wherein the worm in a right-angle transmission engages the circumference of the intermediate gear wheel, wherein the intermediate gear wheel is carried on an intermediate shaft which carries along its axis a spiral pinion, and wherein the reduction mechanism further comprises a second stage formed by the spiral pinion and the output spiral gear wheel, wherein the spiral pinion in a parallel transmission engages the circumference of the output spiral gear wheel, wherein the spiral pinion directly engages with the output spiral gear wheel and a support that engagingly supports the spiral pinion.

2. The adjusting instrument according to claim 1, wherein the spiral pinion comprises a bevel toothing with a tooth angle which is greater than 15°, in particular a tooth angle which is between 15° and 35°.

3. The adjusting instrument according to claim 1, wherein the spiral pinion comprises only one or two teeth.

4. The adjusting instrument according to claim 1, wherein the axial length of the spiral pinion is chosen such that the teeth make at least a half revolution over the circumference of the spiral pinion.

5. The adjusting instrument according to claim 1, wherein the intermediate shaft near the end of the spiral pinion is provided with a bearing.

6. The adjusting instrument according to claim 1, wherein the support includes a support spiral pinion or a bearing surface.

7. The adjusting instrument according to claim 6, wherein the support is placed opposite to the side of the spiral pinion that is in engagement with the spiral gear wheel.

8. The adjusting instrument according to claim 1, wherein the spiral gear wheel is provided with an inner toothing for cooperation with a spindle.

9. The adjusting instrument according to claim 1, wherein the motor and the first stage of the actuator are carried by the housing, and wherein the spiral gear wheel is carried by the pivoting shaft.

10. The adjusting instrument according to claim 2, wherein the spiral pinion comprises only one or two teeth.

11. The adjusting instrument according to claim 2, wherein the axial length of the spiral pinion is chosen such that the teeth make at least a half revolution over the circumference of the spiral pinion.

12. The adjusting instrument according to claim 3, wherein the axial length of the spiral pinion is chosen such that the teeth make at least a half revolution over the circumference of the spiral pinion.

* * * * *